US012790003B2

(12) United States Patent
Kilchyk et al.

(10) Patent No.: US 12,790,003 B2
(45) Date of Patent: Nov. 10, 2026

(54) BINARY FLUID PUMPED COOLING SYSTEM FOR AN AIRCRAFT

(71) Applicant: Hamilton Sundstrand Corporation, Charlotte, NC (US)

(72) Inventors: Viktor Kilchyk, Williamsville, NY (US); Lance R. Bartosz, Granby, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 67 days.

(21) Appl. No.: 18/821,125

(22) Filed: Aug. 30, 2024

(65) Prior Publication Data

US 2026/0062128 A1 Mar. 5, 2026

(51) Int. Cl.

*B64D 13/08* (2006.01)
*B64D 33/08* (2006.01)
*F25B 15/04* (2006.01)
*F25B 49/04* (2006.01)

(52) U.S. Cl.

CPC .............. *B64D 13/08* (2013.01); *B64D 33/08* (2013.01); *F25B 15/04* (2013.01); *F25B 49/04* (2013.01)

(58) Field of Classification Search

CPC ......... B64D 13/08; B64D 33/08; F25B 49/04; F25B 15/04

See application file for complete search history.

(56) References Cited

U.S. PATENT DOCUMENTS

| | | | | |
|---|---|---|---|---|
| 2,287,855 A * | 6/1942 | Babcock | F25B 15/00 62/109 |
| 3,585,809 A * | 6/1971 | Brown | F25B 15/04 200/61.03 |
| 5,647,221 A | 7/1997 | Garris, Jr. | |
| 10,018,386 B2 | 7/2018 | Nishijima et al. | |
| 11,156,231 B2 | 10/2021 | Leighty et al. | |
| 11,273,925 B1 | 3/2022 | O'Meallie et al. | |
| 11,804,754 B2 | 10/2023 | Saviers et al. | |
| 2017/0307259 A1 | 10/2017 | Araki et al. | |
| 2023/0015125 A1 | 1/2023 | Tang et al. | |
| 2023/0384008 A1 | 11/2023 | Zhang | |
| 2025/0376261 A1* | 12/2025 | Kilchyk | B64D 13/08 |

FOREIGN PATENT DOCUMENTS

| | | | |
|---|---|---|---|
| CN | 117337004 A | 1/2024 | |
| CN | 117366905 A * | 1/2024 | F17D 1/005 |

* cited by examiner

*Primary Examiner* — Lionel Nouketcha
(74) *Attorney, Agent, or Firm* — CANTOR COLBURN LLP

(57) ABSTRACT

A cooling system, having: a closed loop; a refrigerant mixture in the loop; an evaporator coupled to the loop; a condenser coupled to the loop, downstream of the evaporator; loop branches connecting the evaporator and the condenser to separately transport vapor and liquid toward the condenser.

6 Claims, 4 Drawing Sheets

BINARY FLUID PUMPED COOLING SYSTEM FOR AN AIRCRAFT

BACKGROUND

The embodiments are directed to aircraft cooling systems and more specifically to a binary fluid pumped cooling system for an aircraft.

Aircraft utilize cooling systems for various purposes, including cooling motors and other electronics. The cooling systems often utilize water as a working fluid. However, the relatively high evaporation temperature of water may result in overheating sensitive equipment. In addition, these systems often utilize compressors to motivate flow in the working fluid, which results in extra weight, operational energy and the potential for maintenance issues.

BRIEF SUMMARY

Disclosed is a cooling system, including: a closed loop; a refrigerant mixture in the loop; an evaporator coupled to the loop; a condenser coupled to the loop, downstream of the evaporator; loop branches connecting the evaporator and the condenser to separately transport vapor and liquid toward the condenser.

In addition to one or more aspects of the above disclosed system or as an alternate, a target fluid is directed over the loop branches before passing over the evaporator, to precool the target fluid and decrease a temperature difference between the target fluid and the refrigerant mixture within the evaporator.

In addition to one or more aspects of the above disclosed system or as an alternate, the refrigerant mixture includes a first refrigerant that is water and a second refrigerant that is ammonia.

In addition to one or more aspects of the above disclosed system or as an alternate, the system includes a pump coupled to the loop between the evaporator and the condenser.

In addition to one or more aspects of the above disclosed system or as an alternate, the system includes an accumulator coupled to the loop, between the condenser and the pump.

In addition to one or more aspects of the above disclosed system or as an alternate, the system includes a porous filter to separate the evaporator into a vapor flow and a liquid flow.

In addition to one or more aspects of the above disclosed system or as an alternate, the loop branches include a vapor branch and a liquid branch, wherein the vapor branch is connected to the condenser.

In addition to one or more aspects of the above disclosed system or as an alternate, the liquid branch includes a pooling vessel for pooling liquid that is transported through the liquid branch.

In addition to one or more aspects of the above disclosed system or as an alternate, the liquid branch is connected to the condenser.

In addition to one or more aspects of the above disclosed system or as an alternate, the vapor branch includes an ejector; and the liquid branch is connected to the ejector.

In addition to one or more aspects of the above disclosed system or as an alternate, the system includes a preheater coupled to the loop between the pump and the evaporator.

In addition to one or more aspects of the above disclosed system or as an alternate, the condenser is air cooled.

Disclosed is another embodiment of the a cooling system, including: a closed loop; a refrigerant mixture in the loop; an evaporator coupled to the loop; a condenser coupled to the loop, downstream of the evaporator; an accumulator coupled to the loop, downstream of the condenser; and loop branches connected to the evaporator to separately transport vapor and liquid toward to ones of the condenser and the accumulator.

In addition to one or more aspects of the above disclosed another embodiment of the system or as an alternate, the loop branches include a vapor branch and a liquid branch, wherein the vapor branch and the liquid branch are connected between the evaporator and the accumulator.

In addition to one or more aspects of the above disclosed another embodiment of the system or as an alternate, the refrigerant mixture includes a first refrigerant that is water and a second refrigerant that is ammonia.

In addition to one or more aspects of the above disclosed another embodiment of the system or as an alternate, the system includes a pump coupled to the loop between the accumulator and the evaporator.

In addition to one or more aspects of the above disclosed another embodiment of the system or as an alternate, the system includes a preheater coupled to the loop between the pump and the evaporator.

In addition to one or more aspects of the above disclosed another embodiment of the system or as an alternate, the system includes a porous filter to separate the evaporator into a vapor flow and a liquid flow.

In addition to one or more aspects of the above disclosed another embodiment of the system or as an alternate, the condenser is air cooled.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
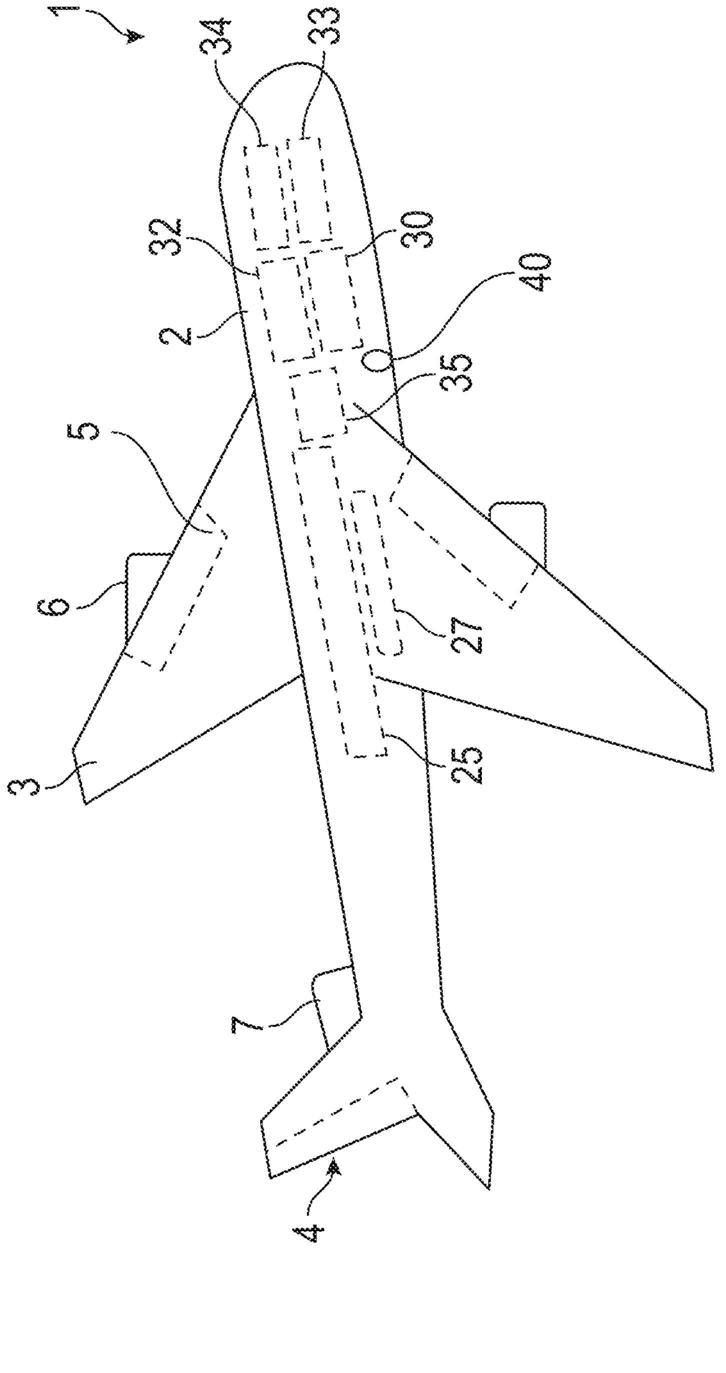
FIG. 1 shows an aircraft that may utilize aspects of the disclosed embodiments.

FIG. 1 shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. The aircraft 1 may have a cabin 25, a cargo bay 27, an environmental control system (ECS) 30 for conditioning the cabin 25 and/or cargo bay 27. The ECS 30 may include a vapor compression system (VCS) 32 that cools air directed to, e.g., the cargo bay 27 and provides refrigeration to one or more systems 35 of the aircraft 1, and an air cycle machine (ACM) 33 that cools air directed to e.g., the cabin 25. A RAM air inlet 40 may scoop air for the ECS 30, or the ECS 30 may receive air recirculated from, e.g., a cabin air compressor (CAC) 34.

Figure 2:
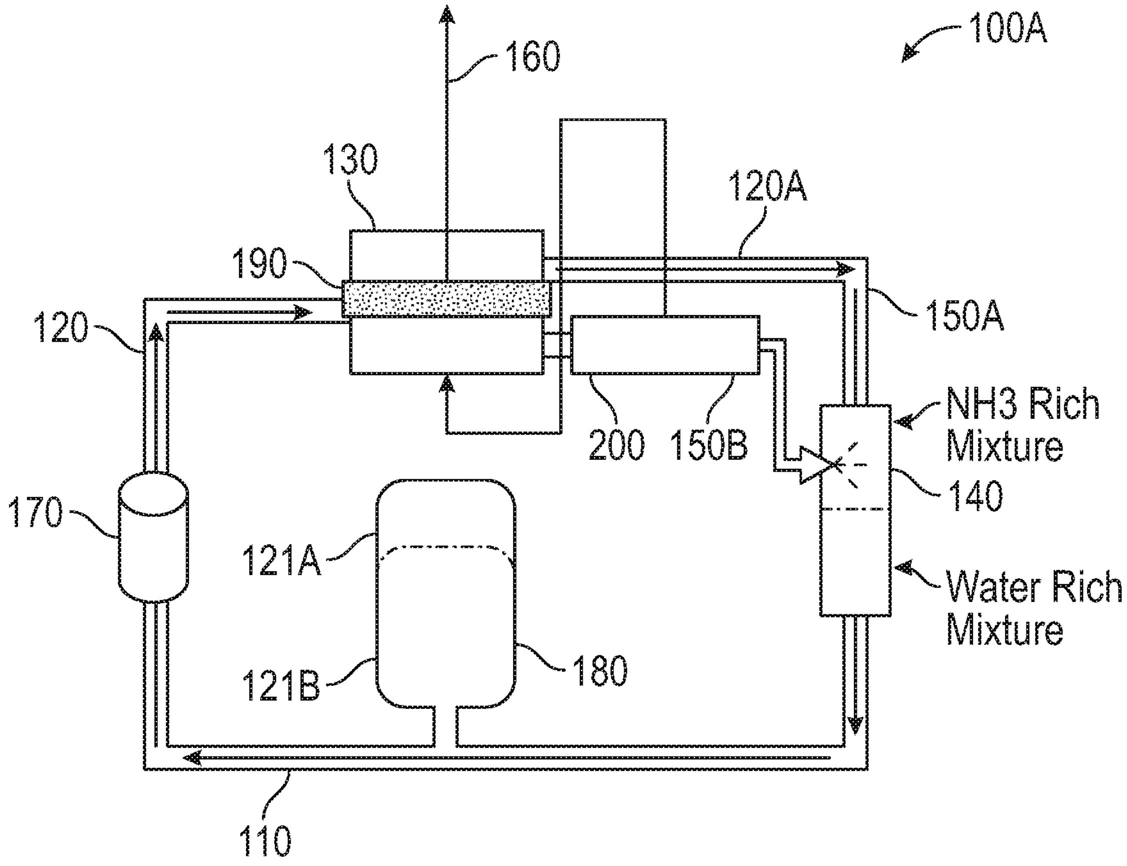
FIG. 2 shows an embodiment of a cooling system, where cooling branches directly connect vapor and liquid flows from an evaporator to a condenser.

Turning to FIG. 2 a cooling system 100A is shown according to an embodiment. The system 100A includes a closed loop 110. A refrigerant mixture 120 circulates within in the loop 110. The refrigerant mixture 120 includes a first refrigerant that is water and a second refrigerant that is ammonia, such that the loop includes a binary fluid. An evaporator 130 is coupled to the loop 110. A condenser 140 is coupled to the loop 110, downstream of the evaporator 130. The condenser 140 may be air cooled.

Loop branches 150, including vapor branch (or first branch) 150A, and a liquid branch (or second branch) 150B, separately transport a vapor flow 120A and a liquid flow 120B, at least one of which connects the evaporator 130 and the condenser 140. As ammonia evaporates at a lower temperature than water, the branches 150 will fill with an ammonia rich vapor flow 120A in the vapor branch 150A and a water rich liquid flow 120B in the liquid branch 150B as heat is drawn from the target fluid 160.

A target fluid 160 is directed over the loop branches 150 before passing over the evaporator 130. This configuration precools the target fluid 160 and decreases a temperature difference between the target fluid 160 and the refrigerant mixture 120 within the evaporator 130.

According to an embodiment, the system 100A includes a pump 170 coupled to the loop 110 between the evaporator 130 and the condenser 140. According to an embodiment, the system 100A includes an accumulator 180 coupled to the loop 110, between the condenser 140 and the pump 170. The accumulator 180 enables mixing of vapor 121A and liquid 121B that have otherwise separated out of the mixture 120. According to an embodiment, the system 100A includes a porous filter 190 to separate the evaporator 130 into vapor flow 120A and a liquid flow 120B.

As shown in FIG. 2, the vapor branch 150A and the liquid branch 150B of the loop branches 150 are both connected to the condenser 140. The liquid branch 150B includes a pooling vessel 200 for pooling liquid that is transported through the liquid branch 150B. The pooling vessel 200 provides a greater surface area of exposure between the liquid branch 150B and the target fluid 160 to enhance the precooling.

The condenser 140 has two parts 140A, 140B. In the first part 140A, liquid with a higher condensing temperature condenses first. In case when binary mixture 120 is ammonia and water (NH3—H2O), ammonia condenses first. The disclosed cooling system 100 has a relatively higher coefficient of performance (COP) due to precooling, along with a lower minimum boiling temperature (−33 degrees Celsius for ammonia as compared with zero degrees Celsius for water), providing evaporative cooling of electronics over a greater temperature range, and a higher maximum condenser temperature, enabling the recovery of waste heat. The use of a compressor is also avoided, reducing maintenance and operational costs.

Figure 3:
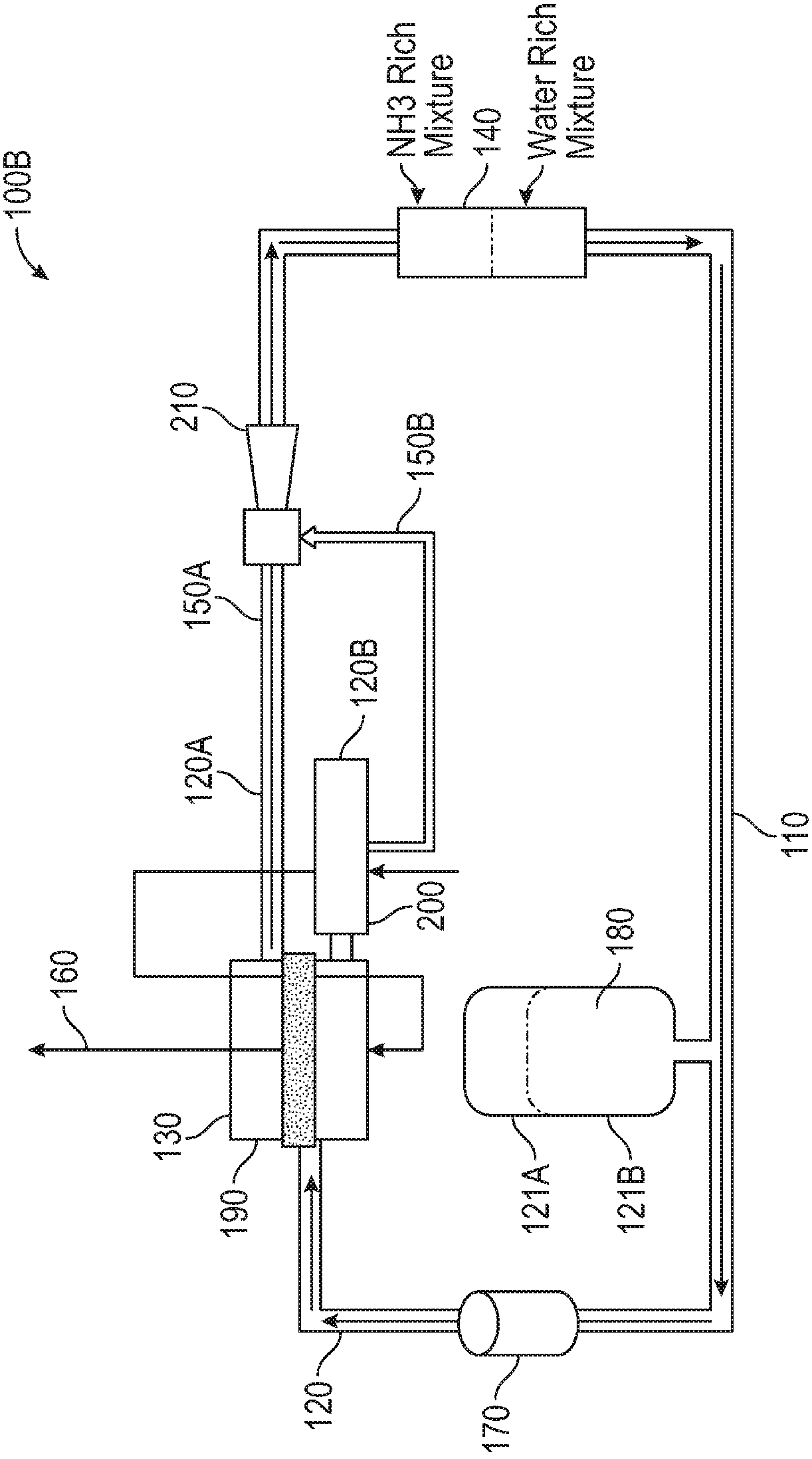
FIG. 3 shows an embodiment of a cooling system, where a cooling branch directly connects a vapor flow from an evaporator to a condenser and a liquid flow from the evaporator to an ejector.

Turning to FIG. 3 a cooling system 100B is shown according to another embodiment. The system 100B includes a closed loop 110. A refrigerant mixture 120 circulates within in the loop 110. The refrigerant mixture 120 includes a first refrigerant that is water and a second refrigerant that is ammonia such that the loop includes a binary fluid. An evaporator 130 is coupled to the loop 110. A condenser 140 is coupled to the loop 110, downstream of the evaporator 130. The condenser 140 may be air cooled.

Loop branches 150, including vapor branch (or first branch) 150A, and a liquid branch (or second branch) 150B, separately transport a vapor flow 120A and a liquid flow 120B, at least one of which connects the evaporator 130 and the condenser 140. As ammonia evaporates at a lower temperature than water, the branches 150 will fill with an ammonia rich vapor flow 120A in the vapor branch 150A and a water rich liquid flow 120B in the liquid branch 150B as heat is drawn from the target fluid 160.

A target fluid 160 is directed over the loop branches 150 before passing over the evaporator 130. This configuration precools the target fluid 160 and decreases a temperature difference between the target fluid 160 and the refrigerant mixture 120 within the evaporator 130.

According to an embodiment, the system 100B includes a pump 170 coupled to the loop 110 between the evaporator 130 and the condenser 140. According to an embodiment, the system 100B includes an accumulator 180 coupled to the loop 110, between the condenser 140 and the pump 170. The accumulator 180 enables mixing of vapor 121A and liquid 121B that have otherwise separated out of the mixture 120. According to an embodiment, the system 100B includes a porous filter 190 to separate the evaporator 130 into vapor flow 120A and a liquid flow 120B.

As shown in FIG. 3, the liquid branch 150B includes a pooling vessel 200 for pooling liquid that is transported through the liquid branch 150B. The pooling vessel 200 provides a greater surface area of exposure between the liquid branch 150B and the target fluid 160 to enhance the precooling.

According to an embedment, the vapor branch 150A includes an ejector 210. The vapor branch 150A is connected to the condenser 140 and the liquid branch 150B is connected to the ejector 210. The ejector 210 converts the high-pressure potential energy in the motive flow (primary, i.e., the vapor flow) into kinetic energy, drawing a flow from the suction port (secondary flow, i.e., the liquid flow) to ensure desired flow conditions in the loop 11.

The condenser 140 has two parts 140A, 140B. In the first part 140A, liquid with a higher condensing temperature condenses first. In case when binary mixture 120 is ammonia and water (NH3—H2O), ammonia condenses first. The disclosed cooling system 100 has a relatively higher coefficient of performance (COP) due to precooling, along with a lower minimum boiling temperature (−33 degrees Celsius for ammonia as compared with zero degrees Celsius for water), providing evaporative cooling of electronics over a greater temperature range, and a higher maximum condenser temperature, enabling the recovery of waste heat. The use of a compressor is also avoided, reducing maintenance and operational costs.

Figure 4:
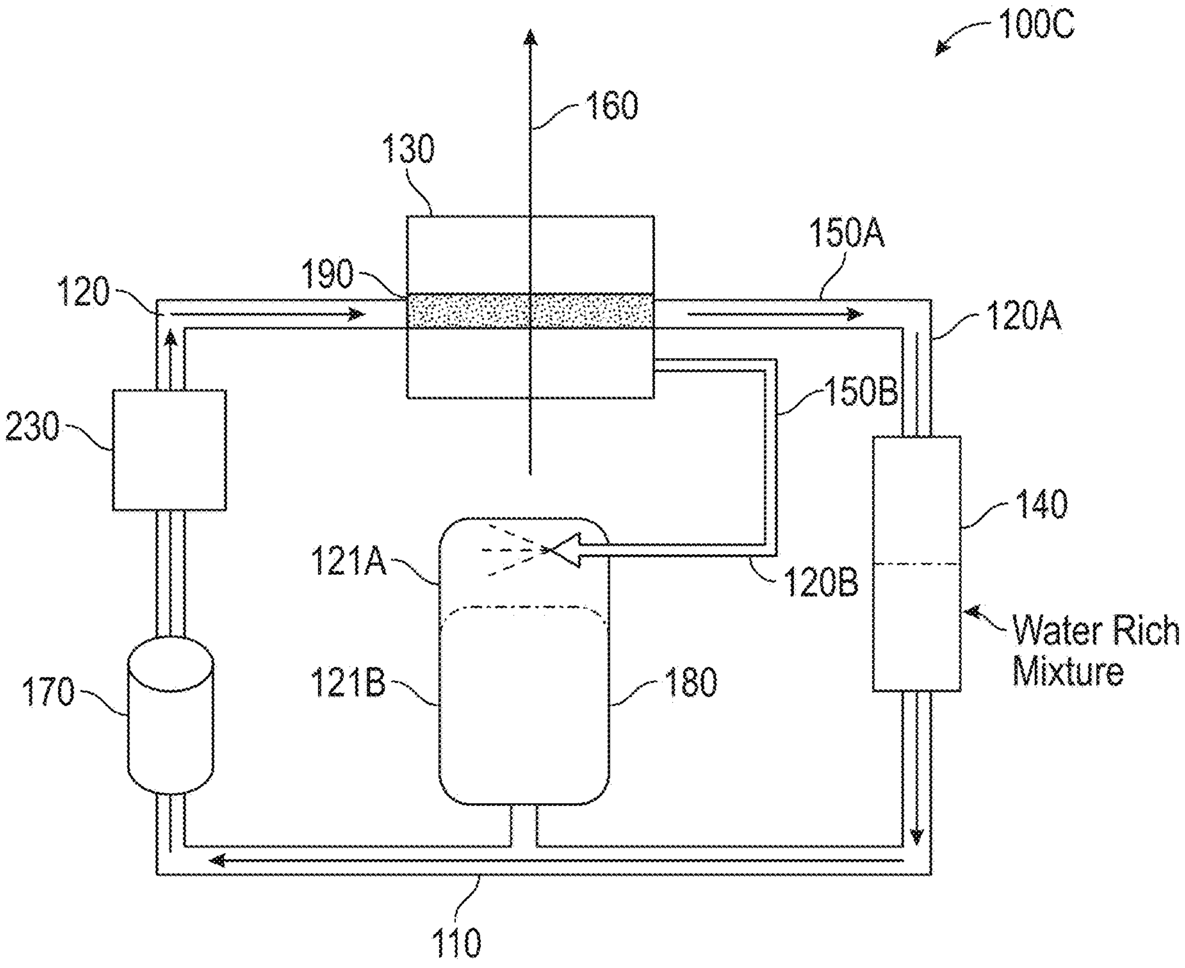
FIG. 4 shows an embodiment of a cooling system, where a cooling branch directly connects a vapor flow from an evaporator to a condenser and a liquid flow from the evaporator to an accumulator.

Turning to FIG. 4 a cooling system 100C is shown according to another embodiment. The system 100C includes a closed loop 110. A refrigerant mixture 120 circulates within in the loop 110. The refrigerant mixture 120 includes a first refrigerant that is water and a second refrigerant that is ammonia such that the loop includes a binary fluid. An evaporator 130 is coupled to the loop 110. A condenser 140 is coupled to the loop 110, downstream of the evaporator 130. The condenser 140 may be air cooled.

Loop branches 150, including vapor branch (or first branch) 150A, and a liquid branch (or second branch) 150B, separately transport a vapor flow 120A and a liquid flow 120B, at least one of which connects the evaporator 130 and the condenser 140. As ammonia evaporates at a lower temperature than water, the branches 150 will fill with an ammonia rich vapor flow 120A in the vapor branch 150A and a water rich liquid flow 120B in the liquid branch 150B as heat is drawn from the target fluid 160.

According to an embodiment, the system 100C includes a pump 170 coupled to the loop 110 between the evaporator 130 and the condenser 140. According to an embodiment, the system 100C includes an accumulator 180 coupled to the loop 110, between the condenser 140 and the pump 170. The accumulator 180 enables mixing of vapor 121A and liquid 121B that have otherwise separated out of the mixture 120. According to an embodiment, the system 100C includes a porous filter 190 to separate the evaporator 130 into vapor flow 120A and a liquid flow 120B.

As shown in FIG. 4, the vapor branch 150A is connected to the condenser 140 and the liquid branch 150B is connected to the accumulator 180. This cools the vapor in the accumulator 180, enabling the mixture 120 to have the desired concentration of ammonia and water. A preheater 230 is coupled to the loop 110 between the pump 170 and the evaporator 130. This increase the boiling efficiency within the evaporator 130.

The condenser 140 has two parts 140A, 140B. In the first part 140A, liquid with a higher condensing temperature condenses first. In case when binary mixture 120 is ammonia and water ($NH_3$—$H_2O$), ammonia condenses first. The disclosed cooling system 100 has a relatively higher coefficient of performance (COP) due to a lower minimum boiling temperature (−33 degrees Celsius for ammonia as compared with zero degrees Celsius for water), providing evaporative cooling of electronics over a greater temperature range, and a higher maximum condenser temperature, enabling the recovery of waste heat. The use of a compressor is also avoided, reducing maintenance and operational costs.

The terminology used herein is for the purpose of describing particular embodiments only and is not intended to be limiting of the present disclosure. The term "about" is intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A cooling system, comprising:

a closed loop;

a refrigerant mixture in the loop;

an evaporator coupled to the loop, the evaporator including a porous filter to separate the evaporator into a vapor flow portion and a liquid flow portion;

a condenser coupled to the loop, downstream of the evaporator;

a vapor branch directly connecting the vapor flow portion of the evaporator to the condenser and a liquid branch directly connecting the liquid flow portion to the condenser whereby vapor and liquid are separately transported toward the condenser directly from the evaporator;

a pooling vessel coupled to the liquid branch, between the evaporator and the condenser, for pooling liquid that is transported through the liquid branch;

an accumulator coupled to the loop, downstream of the condenser, between the condenser and the evaporator; and a pump coupled to the loop, downstream of the accumulator, between the accumulator and the evaporator.

2. The system of claim 1, wherein a target fluid is directed over the loop branches before passing over the evaporator, to precool the target fluid and decrease a temperature difference between the target fluid and the refrigerant mixture within the evaporator.

3. The system of claim 1, wherein the refrigerant mixture includes a first refrigerant that is water and a second refrigerant that is ammonia.

4. The system of claim 1, wherein:

the vapor branch includes an ejector; and the liquid branch is connected to the ejector.

5. The system of claim 1, including a preheater coupled to the loop between the pump and the evaporator.

6. The system of claim 1, wherein the condenser is air cooled.

* * * * *